Dec. 20, 1955      J. S. BENSON      2,727,332
FISHING SINKERS
Filed Jan. 6, 1954
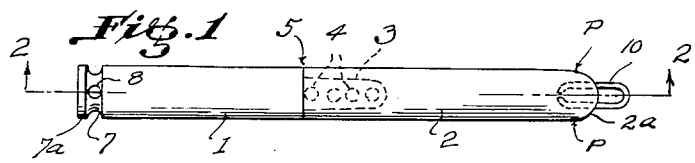
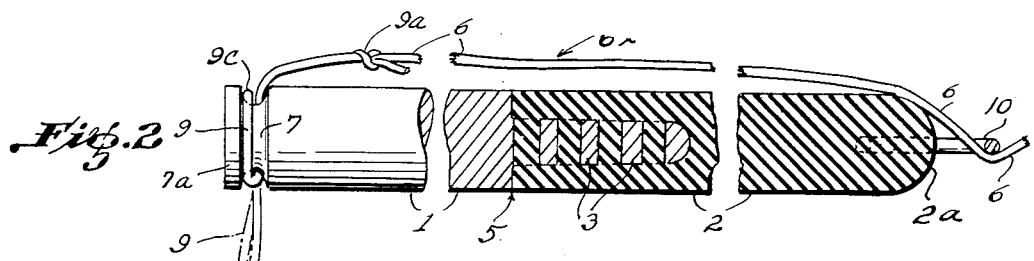
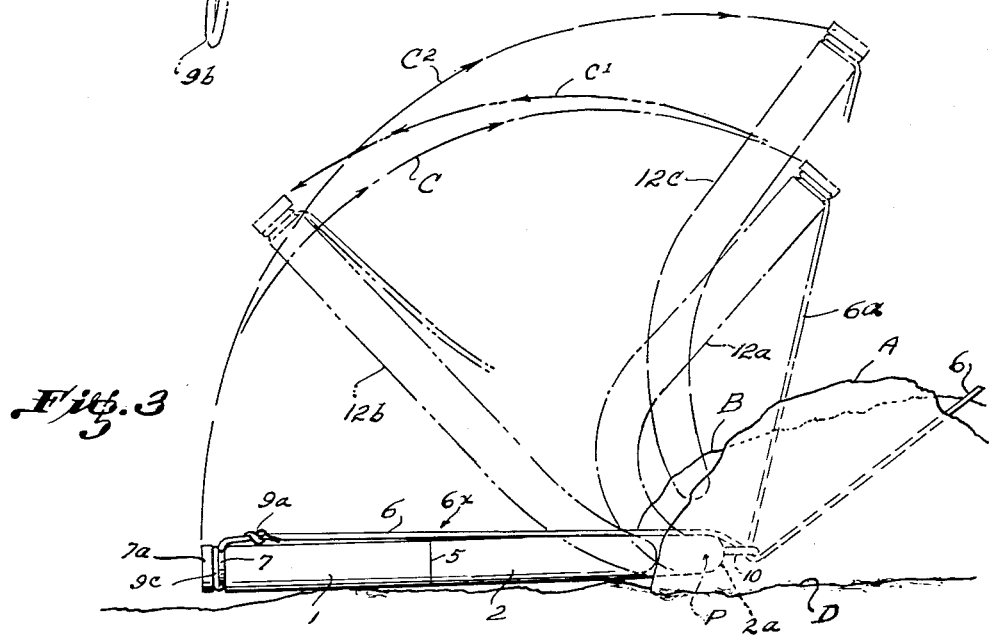
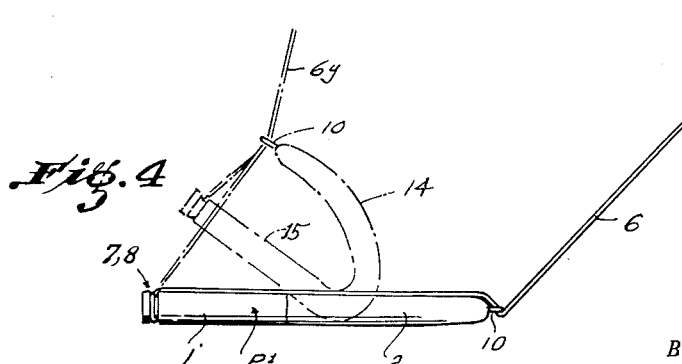
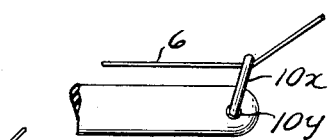
INVENTOR.
JERRY S. BENSON
BY George M. Soule
ATTORNEY

United States Patent Office 2,727,332
Patented Dec. 20, 1955

2,727,332

FISHING SINKERS

Jerry S. Benson, Jefferson, Ohio

Application January 6, 1954, Serial No. 402,538

5 Claims. (Cl. 43—44.97)

This application for United States Letters Patent is a continuation in part of my prior application Serial No. 146,240, copending herewith, filed February 25, 1950, now abandoned, which application is herein identified for record date purposes. I believe it discloses the basic invention to which I am entitled to protection by United States Letters Patent hereunder.

The present invention relates to a fishing sinker having unique snag-resisting qualities, indicating its principal object.

Ordinary fishing sinkers, regardless of their shape and manner of attachment to fishing lines are very susceptible to becoming snagged or lodged, as between coadjacent rocks, in crotches of submerged tree limbs, in coral growths and in generally similar situations such as to defy dislodgement by expedients or procedures ordinarily available to the fisherman. Once caught or snagged, sinkers tend to become more tightly wedged into place, causing serious loss of tackle as nearly all fishermen have experienced.

The present sinker, by reason of shape and construction and manner of attachment to the line, has been proven to enable its quick and easy dislodgement from most snagged positions without requiring the user to quit his fishing position (e. g. to wade into the water or go up or down stream any considerable distance).

Briefly, the present subject sinker device is of elongated form, having an adequate "weight" or relatively high specific gravity element at one end (hereinafter "heavy" end), an elongated elastic arm at the other, means for anchoring the draw line tightly to the heavy end remotely of the arm, and a free running or loose connection for the line on the elastic arm remotely of the heavy end (so that the line normally extends toward the fisherman in the general direction of extent of the free end of the elastic arm). Thereby if the leading end portion of the device becomes snagged, as between rocks, while the heavy end portion is still free, as usually is the case due to the preferred shape of the device, successive jerks on the line, even without having to change the original direction of pull on the line, cause the heavy end to whip back and forth about the caught region as a center, calling into play both centrifugal force and successively stored and released force in or through an elastic medium (catapult action) in order to free the sinker from lodged or caught position as will be further explained. A different, but again highly effectual dislodging action, also further explained later herein, obtains if the heavy end (metal, hence relatively rigid) becomes snagged (e. g. wedged between rocks) while the elastic arm portion remains free.

In the accompanying drawing, Fig. 1 is a plan view of the preferred form of sinker device hereof (without its draw line). Fig. 2 is a fragmentary, mainly sectional, enlarged scale view, with the draw line, and taken generally on section line 2—2 on Fig. 1. Figs. 3 and 4 are largely diagrammatic views illustrating the sinker device in action. Fig. 5 is a fragmentary side elevation showing a modified construction in place of the portion of Fig. 2 which is farthest toward the right.

Constructionally, as shown in Figs. 1 and 2, the weight or heavy end element or portion 1 of the device is a generally cylindrical metal body (e. g. lead or any material which has a higher specific gravity than water), and the opposite end portion 2 is the elastic arm. The elastic arm can be moulded from live rubber or elastomer and advantageously, it is also generally cylindrical, with the same cross section as that of the weight element portion 1. Particularly, the relatively rigid metal end portion 1 is not larger in transverse extent than the adjacent elastic, hence yielding, portion 2 in the region of joint 5 which is a tight peripherally "flush" joint. The two portions 1 and 2 are securely fastened to each other in mutual axial alignment as by moulding the rubber around a spud portion 3 of the metal so shaped that the rubber will interlock with it. The spud portion 3, as shown in Figs. 1 and 2, has a series of cross holes 4 which become filled with rubber during the moulding process, and as already indicated, the elastic arm 1, as nearly as may be, is an uninterruped continuation of the adjacent end of the heavy element 1, flush therewith as to external surfaces, all around joint 5.

The means for anchoring draw line 6 to the heavy end portion 1 so that the attached end of the line will stay in position circumferentially of the sinker axis is preferably a groove 7 intersected by a cross hole 8 centrally of the groove 7. The axis of the cross hole 8 is at right angles to the principal plane of an eyelet 10 (or to the pivotal axis of the eyelet 10 in case the eyelet is pivoted to the sinker as shown at 10y in Fig. 5, in which case it can take the working position shown in broken lines at 10x, Fig. 5); and the eyelet 10 is secured, as shown in full lines, to the free rounded end portion 2a of the elastic arm portion 2 of the sinker device.

To attach the draw line 6 at groove 7, a loop 9 (shown at the left of Fig. 2 by broken and solid lines), is made in the line as by forming a suitable knot 9a; a temporarily narrowed or contracted "end" portion 9b of the loop is then passed downwardly through the hole 8, and then the loop is thrown over the effective flange 7a which defines part of the groove 7. Thereupon the loop 9 (by a pull on line 6) is drawn tightly into final position 9c in the groove 7. For clarity of illustration the line 6, as shown, is of smaller cross section in relation to the sinker dimensions than actually would be used. A relatively coarser line would be very effectually held in place by friction as will be evident from Fig. 2.

The draw line 6, which most fishermen will form from a suitable length strand of fish line attached as a "branch" of the main fish line (not shown), passes from the point of anchorage (groove 7 at top end of cross hole 8) externally along the upwardly exposed side of the sinker device and very loosely through the metal eyelet 10. The eyelet 10, as shown, is a somewhat elongated loop of wire which, for simplicity and security of attachment, is preferably molded into place in the rubber material of the arm portion 2 in axial alignment with the device as a whole. The manner of attachment of the draw line to the sinker device, as described above, establishes the direction in which the device will be drawn through the water, as along the bottom of a stream or coastal water (left toward right, Figs. 1 and 2) and also strongly tends to maintain the device in the position shown by Fig. 1, assuming the paper represents the bottom of the pool or stream in reference to that view, since the sinker-towing portion of the draw line will always extend somewhat upwardly, the angle with reference to the sinker axis being determined (e. g.) by the position of the fisherman and depth of the water.

*Operation*

Assuming A and B, Fig. 3, to represent mutually adjacent rocks embedded in stream bottom D and further, that movement of the draw line 6 has caused the rounded end 2a of the elastic arm portion 2 of the sinker to be forced into a crevice formed between the two rocks, such would usually result in loss of the sinker since, especially if the rocks form a downwardly diverging narrow crevice, no likely available amount of shifting of direction of pull on the line 6 could effect dislodgement. With the present sinker device, exertion of a steady pull on the draw line 6 would now deflect or tend to deflect the sinker about the lodged point P into, (e. g.) the broken-line-illustrated position 12a, Fig. 3, (heavy end tip traversing spiral arc C), thus raising or bodily displacing the heavy element 1 out of alignment with the caught or snagged end portion of the elastic arm, since the forces applied by the draw line at the points of connection to the sinker device will tend to shorten the distance between those points (draw line portion 6a gets as short as possible). Now, the fisherman, by repeatedly jerking his line, as he usually does as though instinctively, has at his disposal two very effectual ways or methods of dislodging the sinker, at least one of which will usually prove successful. If he suddenly slacks the line while the sinker is in the position 12a, the sinker, through release of energy stored in the elastic rubber arm portion 2 of the sinker, assisted by centrifugal force, tends to be propelled beyond its lodged position and to the left (e. g. position 12b), following a path such as indicated by arc $C^1$ due both to centrifugal force and to release of elastically stored force or energy in arm portion 2, so that a subsequently applied pull on the line (at least if in an upward direction) will lift the sinker clear of the "snag." The other way or method mentioned above is illustrated by heavy-end-tip-path-arc $C^2$ which operation is a function of a high speed pull i. e. jerk on the draw line in the original direction of pull (again, an almost instinctive operation by the fisherman, once he finds that his tackle has been snagged). Assuming a sufficiently energetic jerk has been applied to the line as just described, it will be apparent that centrifugal force will cause the tip of the heavy portion 1 of the sinker to describe the relatively wide arc $C^2$ such that the sinker can be thereby catapulted free of the snag. It should be borne in mind that the relatively soft and resilient leading end and adjacent portions of the sinker device hereof are not susceptible to becoming wedged very tightly into a snagging crevice; or, in other words that all the portions 2 of the device, being soft, can much more easily be extracted from caught or lodged position than can the non-resilient heavy portion 1 (assuming its metal is exposed) when that portion gets caught.

Now suppose, for further operational explanation, (see Fig. 4) that the heavy element 1, exclusive of elastic arm portion 2, has become firmly caught in a crevice or is temporarily immobilized from any cause as by application of wedging forces at region $P^1$ of the heavy end portion 1. In that event, a somewhat more upward pull on the draw line (see 6y) causes flexing of the arm portion 2 into the broken-line-illustrated position 14 relative to snagged weight portion 1, which shifts the direction of pull on the sinker device as a whole from the right hand end (free running connection 10, full lines) toward the left hand end at anchorage 7, 8, causing the two end portions 1 and 2 to tend to "jackknife" into the broken line illustrated relationship 14, 15, about the snagged region $P^1$ as a center. If, after the line of pull has been so shifted, (usually enabling the rigid heavy element portion 1 to be rocked about its assumed tightly caught or snagged region $P^1$ which usually starts to dislodge the sinker), slacking of the line allows the elastic element 2 to spring back to its normal full-line-illustrated position in alignment with the weight element. Succeeding pulls or jerks on the line in appropriate directions, followed immediately by slacking, result in teetering of the sinker device until it is usually released from caught position. Since, in the herewith illustrated form of sinker, the heavy element 1 is no larger in transverse cross section than the flexible and elastic element 2 at the juncture 5 of those portions of the device, it is only occasionally that the heavy end will become immobilized by snagging; hence the, first described, manner of extracting the sinker is usually adequate, and that requires no change in the direction of pull on the draw line in order to free the sinker from snags most likely to be encountered in fishing while using the particular sinker hereof or one embodying its basic principles as above described.

I claim:

1. A fishing sinker of elongated approximately cylindrical form comprising a relatively heavy element with reference to water and an elastic rubber arm element tightly joined together in peripherally flush relationship and generally in axial alignment and projecting in opposite directions from each other along their common axis, means adapted for anchoring a draw line fast to the free end of the heavy element, and means adapted to form a free running connection for the draw line at the free end of the elastic arm element, further characterized in that the two means are so related to each other and to said elements that the normal position of the sinker on a generally level bottom of a fishing pool will be arighted, i. e. such that the portion of the draw line which is disposed between said two means will be upwardly of the elements when a forward and upward pull is exerted on the draw line.

2. A fishing sinker of elongated form comprising a relatively heavy portion with reference to water, an elastic elongated arm portion joined tightly thereto at one end of the heavy portion approximately in axial alignment therewith and projecting therefrom, a draw line, anchoring means therefor operating to secure the draw line fast to the free end of the heavy portion, and eye means forming a free running guide for the draw line at the free end of the elastic arm and through which the draw line passes for attachment to fishing gear, further characterized in that the anchoring means and eye means are so located and arranged with reference to each other and the said portions of the sinker that, when the sinker is supported in the water on a generally horizontal surface, an upward and forward pull on the draw line tends to maintain the sinker in arighted position, such that the portion of the draw line lying between the anchoring means and eye means is upwardly of said heavy and arm portions, whereby, whenever either said portion of the sinker becomes snagged, successive upward jerks on the draw line will tend to cause repeated relative "jackknifing" movement of the two said portions of the sinker toward and away from each other in a generally vertical plane or in a plane established by the then position of said portion of the draw line.

3. A fishing sinker of elongated form comprising a heavy element and an elastic arm element of rubber or the like projecting axially therefrom, said elements being joined together approximately in axial alignment and peripherally flush with each other, an anchoring means for a flexible draw line at the free end of the heavy element, a free running guide means for such draw line on the free end of the elastic arm element, and a draw line firmly anchored to the heavy element and passing loosely through the guide means for attachment to fishing gear.

4. The fishing sinker according to claim 3 wherein the heavy element and arm element are approximately cylindrical.

5. A fishing sinker of elongated form having a relatively heavy end portion with reference to water and an elastic arm portion of rubber or the like generally axially aligned therewith and tightly secured thereto and peripherally externally flush therewith, a draw line anchored to the free end of the heavy end portion, and means on the free extremity of the arm portion adapted to form a free running connection for the draw line so as to determine the direction in which the sinker will be pulled through the water and which, in event of either portion becoming snagged, will enable the two portions to be repeatedly "jackknifed" toward each other and released by appropriate jerking on the draw line.

References Cited in the file of this patent

UNITED STATES PATENTS

| | | |
|---|---|---|
| 829,608 | Stanton | Aug. 28, 1906 |
| 1,182,822 | Volk | May 9, 1916 |
| 2,220,358 | Storey | Nov. 5, 1940 |
| 2,461,833 | Mercier | Feb. 15, 1949 |
| 2,636,305 | Shoenfelt | Apr. 28, 1953 |

FOREIGN PATENTS

| | | |
|---|---|---|
| 375,696 | Great Britain | June 30, 1932 |